United States Patent [19]

Lessen

[11] Patent Number: 5,052,261
[45] Date of Patent: Oct. 1, 1991

[54] COMPENSATING VALVE SYSTEM FOR BRASS INSTRUMENTS

[76] Inventor: Martin Lessen, 12 Country Club Dr., Rochester, N.Y. 14534

[21] Appl. No.: 141,329

[22] Filed: Jan. 5, 1988

Related U.S. Application Data

[63] Continuation of Ser. No. 554,695, Nov. 23, 1983.

[51] Int. Cl.$^5$ ............................................. G10D 9/04
[52] U.S. Cl. ...................................... 84/389; 84/388; 84/390; 84/382
[58] Field of Search .................................. 84/382-394

[56] References Cited

U.S. PATENT DOCUMENTS

| | | | |
|---|---|---|---|
| 2,665,606 | 1/1954 | Wohlrab | 84/392 |
| 3,554,072 | 1/1971 | Hirsbrunner | 84/390 |
| 4,336,738 | 6/1982 | Alexander | 84/390 |

FOREIGN PATENT DOCUMENTS

| | | | |
|---|---|---|---|
| 418302 | 9/1925 | Fed. Rep. of Germany | 84/388 |
| 171296 | 9/1885 | France | 84/388 |
| 1021 | 1/1884 | United Kingdom | 84/389 |
| 28599 | 12/1912 | United Kingdom | 84/389 |

OTHER PUBLICATIONS

Draper: "The Besson Compensating System Fully Explained", Besson & Co., Ltd., London, 1953.

*Primary Examiner*—Lawrence R. Franklin
*Attorney, Agent, or Firm*—William F. Noval

[57] ABSTRACT

Improved apparatus for providing a chromatic scale with accurate intonation for valved brass instruments is disclosed. Two embodimeents of the invention that compensate for the deficiencies of the valve systems of the prior art are described for both four and five valve systems. For four valves systems, a master valve is used to lower the pitch of the instrument by two tones, and for five valve systems, a master valve lowers the pitch by two and one-half tones. The invention, therefore, makes possible complete compensation over the range of the instrument and improved tone quality.

28 Claims, 5 Drawing Sheets

COMPENSATING VALVE SYSTEM FOR BRASS INSTRUMENTS

This is a continuation of application Ser. No. 06/554,695, filed on Nov. 23, 1983, of Martin Lessen, for "A Compensating Valve System for Brass Instruments."

FIELD OF THE INVENTION

The invention relates to a compensating valve system that provides complete compensation over the entire range of a valved brass instrument, thereby improving intonation and tone quality.

DESCRIPTION OF THE PRIOR ART

Throughout the specification and claims, the term "valved brass instrument" is used to refer generally to that class of musical instrument that is sounded by vibration of the player's lips, such as the cornet, french horn, fluegel-horn, euphonium, trumpet, tuba, etc., and which includes a valve system for producing changes in pitch. A valved brass instrument is comprised of a mouthpiece section, a bell section, and a valve system that defines and alters the acoustical path between the mouthpiece and the bell sections. The "fundamental pitch or tone" of a brass instrument is the lowest note which can be produced on the open tube of the instrument.

The following references are hereby incorporated by reference in this specification: (1) "Musical Wind Instruments" by Adam Carse, Da Capo Press, New York 1965 (hereinafter Carse), (2) "Early Attempts at Compensation" issued by Boosey & Hawkes Limited, London 1954 (hereinafter Boosey), (3) "The Trumpet and Trombone" by Philip Bate, Ernest Benn, London 1978 (hereinafter Bate), (4) "Notes on the Besson System of Automatic Compensation of Valved Brass Instruments" by F. C. Draper, Edgware, Middlesex 1954 (hereinafter Draper), (5) "Brass Instruments, Their History and Development" by Anthony Baines, Faber & Faber, London 1976 (hereinafter Baines).

The trumpet is the oldest of the valved brass instruments. The natural trumpet sounds the harmonic series where, in principle, the frequency of each note in the series is an integer multiple of the frequency of the fundamental pitch or tone of the instrument. The modern valve trumpet is a chromatic instrument. Since it plays in a range where the harmonic series does not offer the possibility of a chromatic scale, gaps between the natural harmonics must be filled in by varying the acoustical path of the instrument. Early methods of so doing consisted in opening ports in the side of the air column of the instrument and resulted in the keyed trumpet of Anton Weidinger, which at the time was considered such an improvement over the natural (clarino) trumpet that Haydn composed his famous Concerto in Eb for this instrument. Though the keyed system remained popular for the Saxhorn series of instruments such as the bugle and ophicleide for some years, it was superseded in the early 19th century by slides (similar in principle to trombone slides) and valves for the trumpet. Valves were later applied to the entire family of brass instruments with the exception of the pure slide trombone.

By adding to or subtracting from the acoustical path, valves change the resonant pitch of a brass instrument and therefore change the frequency at which the instrument resonates. The basic valve system of valved brass instruments consists of three valves, the first of which lowers the pitch of the instrument by one tone, the second of which lowers the pitch by a one-half tone, and the third by one and one-half tones. At first glance it might seem that combinations of these valves could lower the pitch of the instrument successively in half tones to a maximum of three tones. However, as is well known, for an acoustical path formed by an unperturbed bore and valve loops dimensioned to play in tune when used singly, valves used in combination will cause the instrument to play sharp. This result may be demonstrated in the following manner. If the ratio of the additional acoustical path length to the original by the first, second and third valves is taken as $\gamma$, $\delta$, $\epsilon$ respectively, then to lower the resonant pitch of the instrument by $1\frac{1}{2}$ tones, the total acoustical path length must be $$L_o(1+\epsilon)=L_o(1+\gamma)(1+\delta)=L_o(1+\gamma+\delta+\gamma\delta)$$

where $L_o$ is the original acoustical path length of instrument. If the first two valves are used in combination, there will be a deficit in length of $L_o\gamma\delta$ and the pitch must be adjusted either by the performer exciting the instrument off resonance, or the bore of the instrument must be so perturbed that the particular note desired will sound in tune. Alternatively, an adjustable valve slide may be used. This same analysis holds for the other valve combinations.

During the last century, early trumpet acousticians such as Victor Mahillon and D. J. Blaikley found that when the bore of a brass instrument such as the trumpet was narrowed at a pressure antinodal point, the pitch of the trumpet was raised for that particular note, and when the bore was narrowed at a pressure nodal point, the pitch of the note was lowered. In principle, therefore, it would seem that deficiencies such as those heretofore illustrated could be remedied. The ultimate desirability of so doing, however, can be questioned by first noting that the harmonics of a note so tampered will not sound in a true harmonic series because the nodes and antinodes of the higher modes of vibrations of the air column will generally not fall where the bore of the instrument has been varied. The net result is that whereas the fundamental of a note so adjusted will resonate at the desired pitch, the overtones of that note will be excited off resonance and the tone color of the instrument will be impaired.

A fundamental approach to remedying the basic deficiencies of the standard valved brass instrument valve system was evolved in trumpets in two different ways by J. B. Arban and D. J. Blaikley. (See, for example, Carse at pages 75–76, Boosey at pages 6–7, Bate at pages 179–180, and Draper generally throughout.) Both methods compensate for the deficiency in the acoustical path length of valve combinations and both methods have advantages peculiar to themselves.

In the case of the Arban method, the method logic coincides with that of a "double" trumpet. The third valve is a master valve which separates the pitches of the two "trumpets" by one and one half tones. When the third valve is depressed, the air column is routed via a new and separate circuit through the first two valves that includes valve loops appropriate for the lower pitch of the second part of the "double" instrument. Thus, the valves used individually, and the first two valves used singly in combination with the third, will play in tune if the valves are tight and the bore is not compromised in passage through the valves.

In the Blaikley method, the third valve loop is routed in a separate acoustical path through the valves so that small corrective addendum loops can be added to the acoustical path when either of the first two valves is used in combination with the third.

In like manner, Arban and Blaikley four valve systems have been devised for and used in brass instruments. In the usual four valve compensated instrument, the fourth valve loop lowers the pitch of the instrument by two and one-half tones. (See Draper, generally throughout, and Baines at pages 217-218, 224-225.) Therefore, valve loops to correctly lower the pitch of the instrument by one, one-half, one and one-half, and two and one-half tones are available. This approach, however, has the serious disadvantage of leaving the two tone interval uncompensated.

SUMMARY OF THE INVENTION

In accordance with the present invention, a compensating valve system is disclosed for use in a valved brass instrument that provides complete compensation of all tones in a range of the instrument. The compensating valve system comprises first and second acoustical paths adapted for connection between the mouthpiece and bell section of a valved brass instrument. When acoustically connected to the mouthpiece and the bell section, the first and second acoustical paths resonate at a fundamental pitch and a pitch two tones lower than the fundamental pitch, respectively. Means are provided for selectively connecting either of the first or second acoustical paths to the mouthpiece and bell section. The first and second acoustical paths are modifiable so that the pitch of the acoustical paths when acoustically connected to the mouthpiece and the bell sections can be lowered by one tone, one-half tone, and one and one-half tones.

In a second embodiment of the invention, a five valve system is provided wherein the first and second acoustical paths, when acoustically connected to the mouthpiece and the bell section, differ in resonant pitch by two and one-half tones. Means are provided to modify the first and second acoustical paths so that the pitch of the acoustical paths when acoustically connected to the mouthpiece and bell sections can be lowered by one tone, one-half tone, one and one-half tones, and two tones.

This embodiment may be more specifically characterized as a compensating valve system intended to fit between mouthpiece and bell sections in a valved brass instrument and comprising a master valve having two positions, each of which comprises a different acoustical path connection between mouthpiece and bell sections, the two acoustical paths differing in length so as to cause the instrument to sound two and one-half tones lower with one master valve position than with the other; and four valves each having two positions such that in one position, the acoustical path connections from the master valve and passing through the four valves maintain their length and in the other position, said acoustical paths are lengthened by appropriate addendum acoustical paths to effect a lowering of the pitch of the instrument using each acoustical path by one tone in one valve, one-half tone in the next valve, one and one-half tones in the third valve and two tones in the fourth valve over and above whatever lowering is caused by the action of the master valve.

In a further embodiment of the invention, first and second acoustical paths are adapted to be serially connected between the mouthpiece and bell section to lower the resonant pitch by two tones below the fundamental pitch at which the first acoustical path alone resonates when connected to the mouthpiece and bell section. Means are provided to lower the pitch of each path when connected between the mouthpiece and bell section by one tone, one-half tone, and one and one-half tones.

In a still further embodiment, the serially connected acoustical paths differ in resonant pitch by two and one-half tones, and means are provided to lower the pitch of each path when connected between the mouthpiece and bell section by one tone, one-half tone, one and one-half tones, and two tones.

This embodiment may be more specifically characterized as a compensating valve system intended to fit between mouthpiece and bell sections in a valved brass instrument and comprising five valves each having two positions such that in one position the acoustical path through the valves from mouthpiece to bell sections maintains its length and in the other position, the acoustical path is lengthened by appropriate addendum acoustical paths to effect a lowering of the pitch of the instrument by one tone in one valve, one-half tone in the next valve, one and one-half tones in the third valve, two tones in the fourth valve and two and one-half tones in the fifth or master valve; the addendum acoustical path of the fifth valve passing through the other four valves in such a way that corrective acoustical path loops are added to the fifth valve addendum loop when the four valves are in a position to include their respective addendum loops in the instrument acoustical path; the corrective loops in conjunction with the addendum loops serve to depress the pitch of the instrument over and above that caused by the master valve addendum loop alone by the tonal amounts corresponding to those of the addendum loops of the respective valves when the fifth valve addendum loop is not included in the total acoustical path.

As will be seen from the detailed description which follows the advantages of systems in accordance with the invention for the execution of difficult, rapid passages containing many accidentals can easily be demonstrated using examples from the standard literature.

Further advantages of the herein disclosed invention are that the use of the fifth partial (overtone) which is flat may be eliminated by using valve combinations (fully compensated) in connection with the sixth partial which is well in tune, and that for older trumpet parts as scored for large F, E and Eb trumpet, the parts can be rendered as intended on the higher partials by using compensated or partially compensated valve combinations. The useful range of the instrument is also extended downward to lower notes.

Finally, the present invention proposes that for the shorter brass instruments, certain acoustical path lengths are incorporated within the interior structure of the valves, e.g. valve pistons in the case of piston valves, thus simplifying the structure of the instruments.

DETAILED DESCRIPTION OF THE INVENTION

Figure 1A:
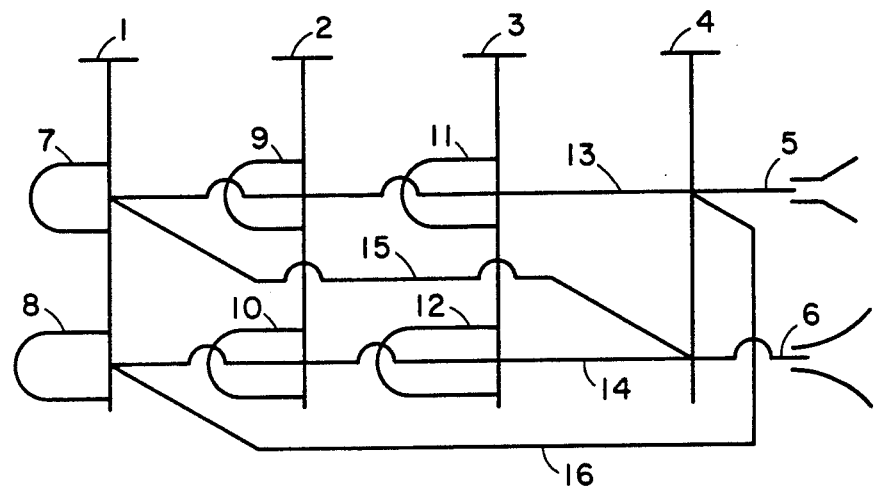
FIG. 1a shows a schematic diagram of a first compensating 4 valve system in accordance with the present invention.

Reference is now made to FIG. 1a which schematically illustrates one embodiment of the present invention. In the embodiment of FIG. 1a, there are shown four valves, 1, 2, 3, 4 with mouthpiece section 5 and bell section 6 of a valved brass musical instrument utilizing this invention. Valve 1 has two addendum bows 7, 8 which are included in the acoustical paths passing through valve 1 when valve 1 is actuated; Valve 2 has two addendum bows, 9, 10 which are included in the acoustical paths passing through valve 2 when valve 2 is actuated, and valve 3 has two addendum bows 11, 12 which are included in the acoustical paths passing through valve 3 when 3 is actuated. Bows 7, 9, and 11 are the upper bows on valves 1, 2, 3 respectively and add acoustical path lengths to the upper acoustical path 13 through the valves, and bows 8, 10, 12 are the lower bows on valves 1, 2, 3 respectively and add lengths to the lower acoustical path 14 through the valves. Valve 4 in this embodiment is the master valve. When valve 4 is in the up position the acoustical path proceeds from the mouthpiece section 5 to the acoustical path 13, through valves, 1, 2, 3 the by-pass acoustical path 15 and through the bell section 6. However, when valve 4 is actuated, the acoustical path proceeds through the acoustical path 16 to the acoustical path 14, through valves 1, 2, 3 and through the bell section 6. It is to be noted that acoustical path 15, when in use, by-passes acoustical path 14; acoustical path 16, when in use, by-passes acoustical path 13. The acoustical path lengths of the addendum bows 7, 9, 11 on valves 1, 2, 3 respectively are such that they lower the pitch of the acoustical path 5, 13, 15, 6 by one tone, one-half tone, and one and one-half tones when valves 1, 2, 3 respectively are individually actuated. The acoustical path lengths of the addendum bows 8, 10, 12 on valves 1, 2, 3 respectively are such that they lower the pitch of the acoustical path 5, 16, 14, 6 by one tone, one-half tone, one and one-half tones when valves 1, 2, 3 respectively are individually actuated. When valve 4 is actuated, the acoustical path 5, 16, 14, 6 is of such a length that it is two tones lower in pitch than the acoustical path 5, 13, 15, 6 when valve 4 is in the alternate position.

Figure 1B:
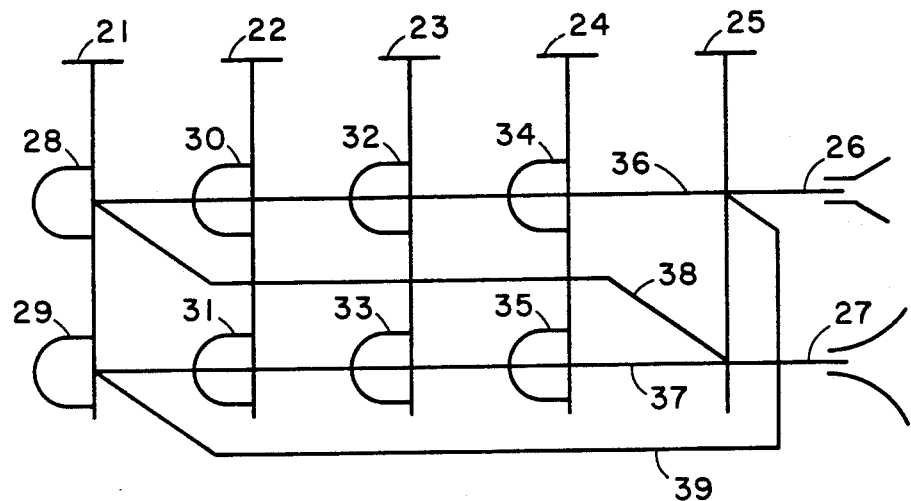
FIG. 1b shows a schematic diagram of a first compensating 5 valve system in accordance with the present invention.

Reference in now made to FIG. 1b which schematically illustrates a second embodiment of the present invention. In the embodiment of FIG. 1b, there are shown five valves 21, 22, 23, 24, 25 with mouthpiece section 26 and bell section 27 of a valved brass musicial instrument utilizing this invention. Valve 21 has two addendum bows 28, 29 which are included in the acoustical paths passing through valve 21 when valve 21 is actuated; valve 22 has two addendum bows 30, 31 which are included in the acoustical paths passing through valve 22 when valve 22 is actuated; valve 23 has two addendum bows 32, 33 which are included in the acoustical paths passing through valve 23 when valve 23 is actuated and valve 24 has two addendum bows 34, 35 which are included in the acoustical paths passing through valve 24 when valve 24 is actuated. Bows 28, 30, 32, 34 are the upper bows on valves 21, 22, 23, 24 respectively and add acoustical path lengths to the upper acoustical path 36 through the valves and bows 29, 31, 33, 35 are the lower bows on valves 21, 22, 23, 24 respectively and add length to the lower acoustical path 37 through the valves. Valve 25 in this embodiment is the master valve. When valve 25 is in the unactuated position the acoustical path proceeds from the mouthpiece section 26 to the acoustical path 36 through valves 21, 22, 23, 24, the by-pass accoustical path 38 and through the bell section 27. However, when valve 25 is actuated, the acoustical path proceeds through the acoustical path 39 to the acoustical path 37, through valves, 21, 22, 23, 24 and through the bell section 27. It is to be noted that acoustical path 38, when in use, by-passes acoustical path 37; acoustical path 39, when in use, by-passes acoustical path 36. The acoustical path lengths of the addendum bows 28, 30, 32, 34 on valves 21, 22, 23, 24 respectively are such that they lower the pitch of the acoustical path 26, 36, 38, 27 by one tone, one-half tone, one and one half tones, and two tones when valves 21, 22, 23, 24 respectively are individually activated. The acoustic path lengths of the addendum bows 29, 31, 33, 35 on valves 21, 22, 23, 24 respectively are such that they lower the pitch of the acoustical path 26, 39, 37, 27 by one tone, one-half tone, one and one-half tones, and two tones when valves 21, 22, 23, 24 respectively are individually activated. When valve 25 is actuated, the acoustical path 26, 39, 37, 27 is of such a length that it is two and one-half tones lower in pitch than the acoustical path 26, 36, 38, 27 when valve 25 is in the alternate position.

Figure 2A:
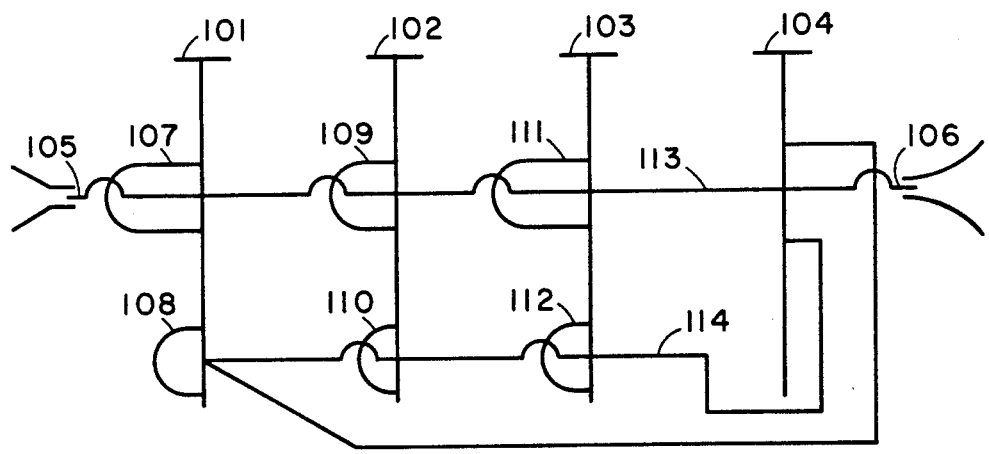
FIG. 2a shows a schematic diagram of a second compensating 4 valve system in accordance with the present invention.

Reference is now made to FIG. 2a which schematically illustrates another embodiment of the present invention. In the embodiment of FIG. 2a, there are shown four valves 101, 102, 103, 104 with mouthpiece section 105 and bell section 106 of a typical valved brass musical instrument utilizing another embodiment of this invention. Valve 101 has two addendum bows 107, 108 which are included in the acoustical path passing through valve 101 when valve 101 is actuated. Valve 102 has two addendum bows 109, 110 which are included in the acoustical path passing through valve 102 when valve 102 is actuated, and valve 103 has two addendum bows 111, 112 which are included in the acoustical path passing through valve 103 when valve 103 is actuated. Bows 107, 109, and 111 are the indicated upper bows on valves 101, 102, and 103 respectively and add acoustical path lengths to the acoustical path 113 through the valves. Bows 108, 110, and 112 are the indicated lower bows on valves 101, 102, and 103 respectively and add acoustical path lengths to the acoustical path 114 through the valves. Valve 104 in this embodiment is the master valve and its addendum bow passes, via the indicated lower air column 114, through valves 101, 102 and 103. The acoustical path lengths of the addendum bows 107, 109, 111, on valves 101, 102, 103 respectively are such that they lower the pitch of the acoustical path 105, 113, 106 by one tone, one-half tone, and one and one-half tones when valves 101, 102, 103 respectively are individually actuated. When valve 104 is individually actuated, its addendum bow - acoustical path 114 is included in the total acoustical path and lowers the pitch of the acoustical path 105, 113, 106 by two tones. The lengths of the indicated lower, corrective addendum bows 108, 100, 112 on valves 101, 102, 103 respectively are such that they, in combination with addendum bows 107, 109, 111 lower the pitch of the acoustical path 105, 113, 114, 106 by one tone, one-half tone, one and one-half tones respectively when valves 101, 102, 103, respectively are individually actuated with valve 104 in the actuated position.

Figure 2B:
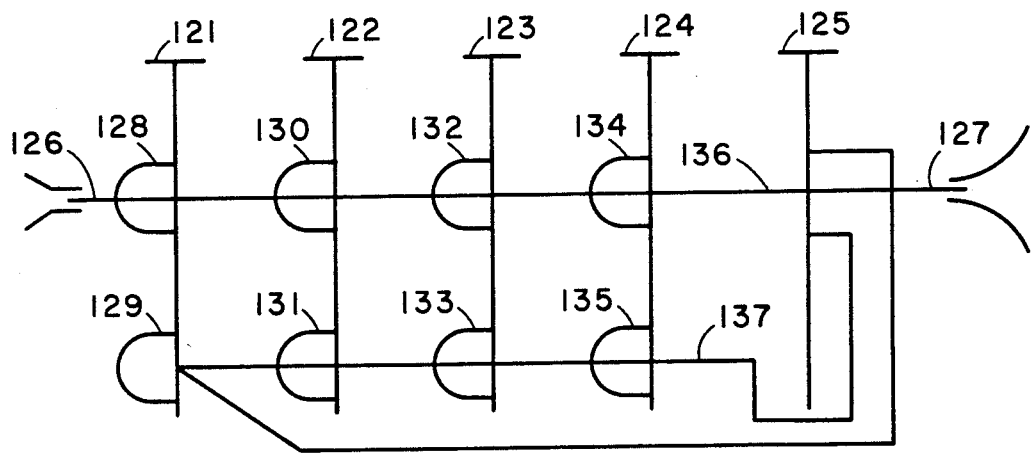
FIG. 2b shows a schematic diagram of a second compensating 5 valve system in accordance with the present invention.

Reference is now made to FIG. 2b which schematically illustrates yet another embodiment of the present invention. In the embodiment of FIG. 2b, there are shown five valves 121, 122, 123, 124, 125 with mouthpiece section 126 and bell section 127 of a typical valved brass musical instrument utilizing yet another embodiment of this invention. Valve 121 has two addendum bows 128, 129 which are included in the acoustical paths passing through valve 121 when valve 121 is actuated. Valve 122 has two addendum bows 130, 131 which are included in the acoustical paths passing through valve 122 when valve 122 is actuated; valve 123 has two addendum bows 132, 133 which are included in the acoustical paths passing through valve 123 when valve 123 is actuated and valve 124 has two addendum bows 134, 135 which are included in the acoustical paths passing through valve 124 when valve 124 is actuated. Bows 128, 130, 132, 134 are the indicated upper bows on valves 121, 122, 123, 124 respectively and add acoustical path lengths to the acoustical path 136 through the valves. Bows 129, 131, 133, 135 are the indicated lower bows on valves 121, 122, 123, 124 respectively and add acoustical path lengths to the acoustical path 137 through the valves. Valve 125 in this embodiment is the master valve and its addendum bow passes, via the indicated lower air column 137 through valves 121, 122, 123, 124. The acoustical path lengths of the addendum bows 128, 130, 132, 134 on valves 121, 122, 123, 124 respectively are such that they lower the pitch of the acoustical path 126, 136, 127 by one tone, one-half tone, one and one-half tones, and two tones when valves 121, 122, 123, 124 respectively are individually activated. When valve 125 is individually activated, its addendum bow - acoustical path 137 - is included in the total acoustical path and lowers the pitch of the acoustical path 126, 136, 127 by two and one-half tones. The lengths of the indicated lower-corrective addendum bows 129, 131, 133, 135 on valves 121, 122, 123, 124 respectively are such that they, in combination with addendum bows 128, 130, 132, 134, lower the pitch of the acoustical path 126, 136, 137, 127 by one tone, one-half tone, one and one-half tones, and two tones when valves 121, 122, 123, 124 respectively are individually activated with valve 125 in the actuated position.

Figure 3:
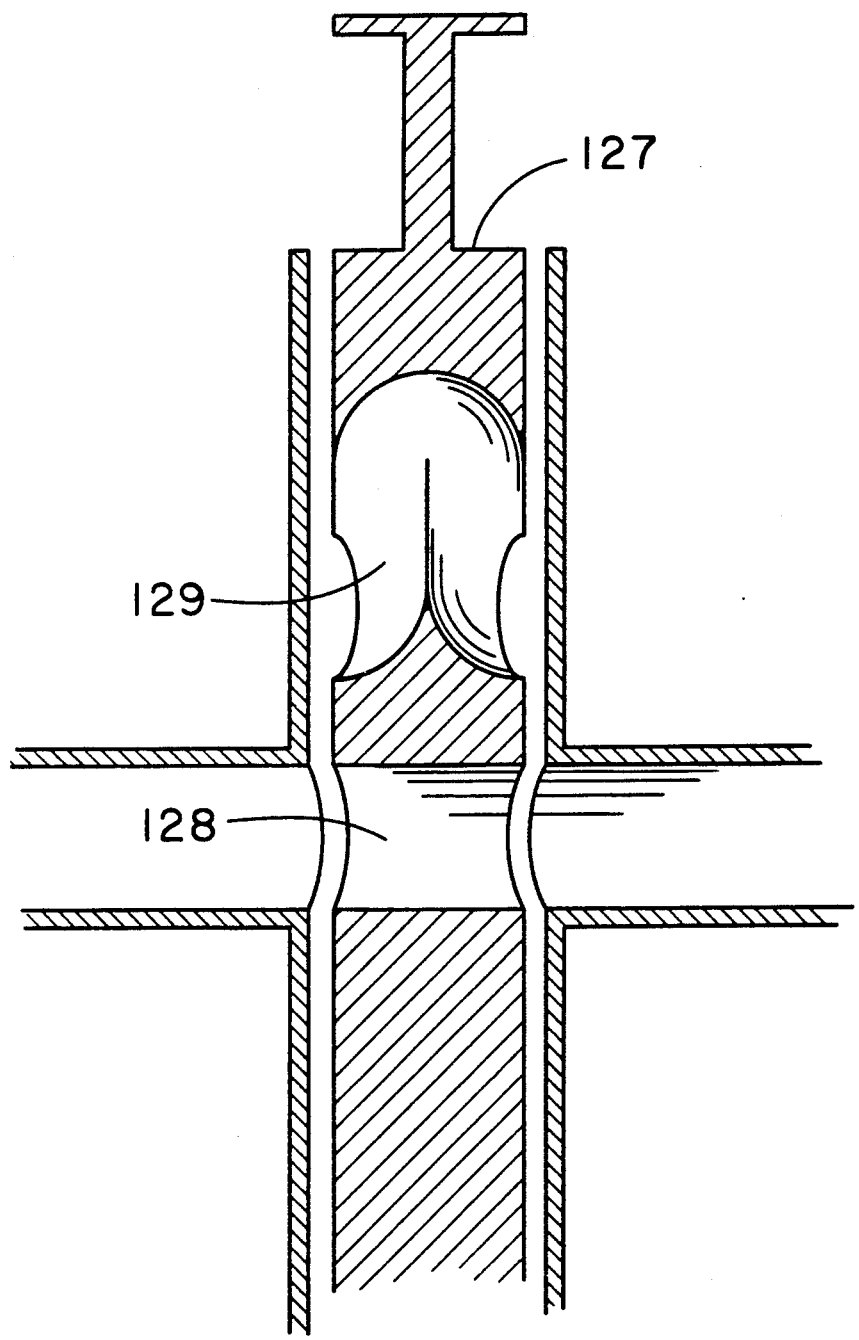
FIG. 3 shows how, in accordance with the invention, certain acoustical path lengths can be incorporated inside the valve pistons in certain applications.

Reference is now made to FIG. 3 which shows how the indicated lower corrective addendum bows in the embodiment just described can be included within the interior structure of the valves, e.g. the valve pistons in the case of piston valves for certain applications. These applications include the soprano instruments where the corrective addendum bows in the Blaikley system are short enough so that there is sufficient room inside the pistons to contain them in addition to the usual transfer passages. In such applications, besides the usual passages, a typical piston 127 contains two passages 128, 129 such that the difference in acoustical path length between the passages 128, 129 comprises the desired corrective addendum bow. As shown, in the piston up position, the acoustical path proceeds through the shorter passage 128 while in the piston down position, the acoustical path proceeds through the longer passage 129. It is clear that such corrective addendum bows contained within the valve structures can be applied to 3 and 4 valve Blaikley systems as previously described in Draper, pages 14, 15, 22 and 23.

Figure 4A:
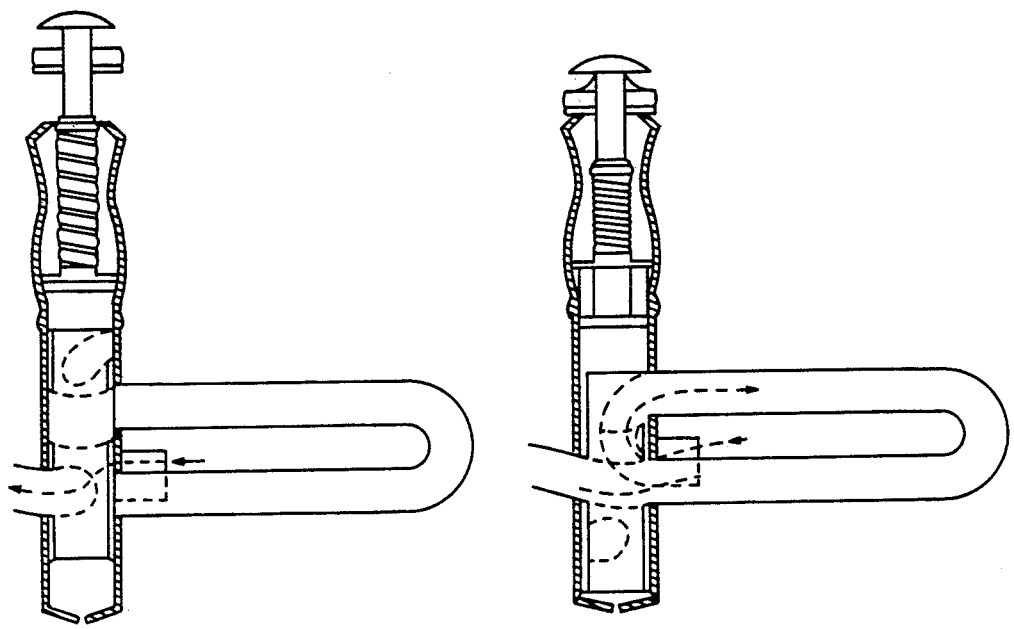
FIGS. 4a and 4b illustrate piston type valve and rotary type valve structure, respectively.
Figure 4B:
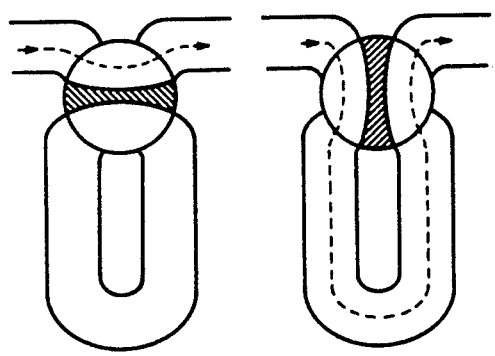

Both systems can also be designed using rotary valves (FIG. 4b) instead of piston valves (FIG. 4a).

Figure 5:
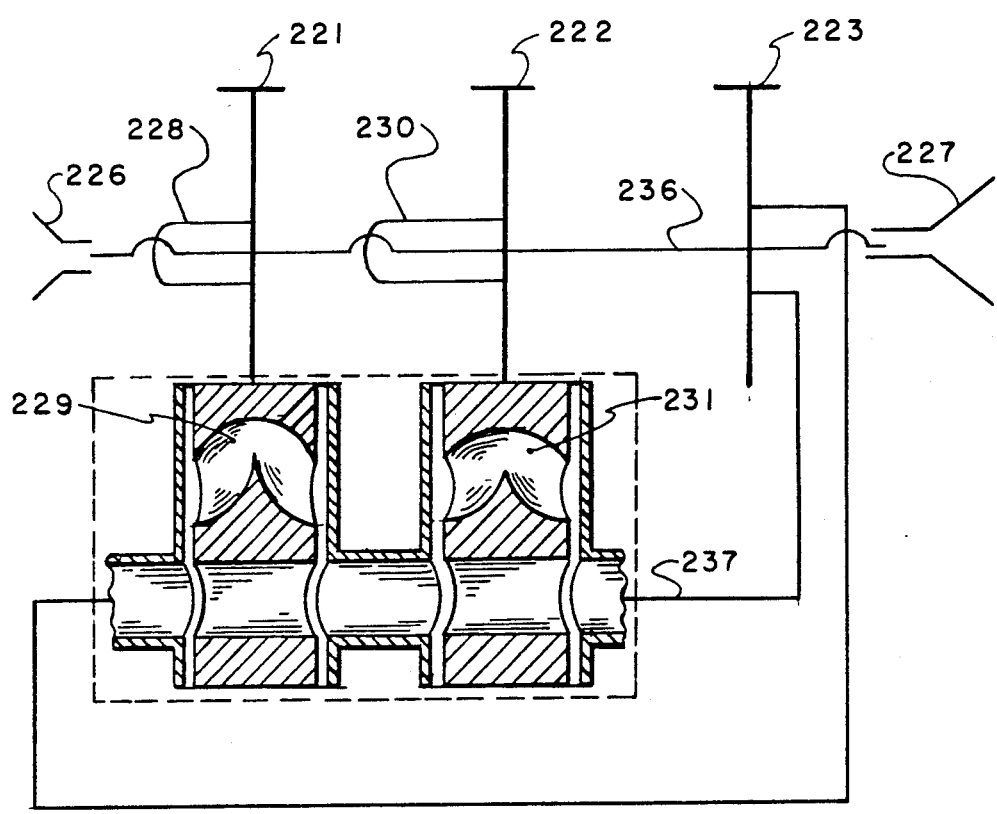
FIG. 5 is a partially schematic, partially sectional elevational view of another embodiment of the present invention.

Reference is now made to FIG. 5 which illustrates another embodiment of the present invention. As shown, three valves 221, 222 and 223 are disposed between mouthpiece section 226 and bell section 227 of a typical valved brass instrument utilizing another embodiment of this invention. Valve 221 has two addendum bows 228, 229 which are included in the acoustical path passing through valve 221 when valve 221 is actuated. Valve 222 has two addendum bows 230, 231 which are included in the acoustical path passing through valve 222 when valve 222 is actuated. Bows 228, 230 are the indicated upper bows on valves 221, 222 and add acoustical path lengths to the acoustical path 236 through the valves. Bows 229 and 231 are the indicated lower addendum bows on valves 221 and 222 respectively and add acoustical path lengths to the second acoustical path 237 through the valves. As shown, bows 229, 231 are incorporated into the interior structure of valves 221, 222, respectively. Valve 223 in this embodiment is the master valve and its addendum bow passes, via the indicated second acoustical path 237, through valves 221 and 222. The acoustical path lengths of the addendum bows 228, 230 on valves 221, 222, respectively, are such that they lower the pitch of the acoustical path 226, 236, 227 by one tone and one-half tone, when valves 221, 222 are individually actuated. When valve 223 is individually actuated, its addendum bow - second acoustical path 237 is included in the total acoustical path and lowers the pitch of the acoustical path 226, 236, 227 by one and one-half tones. The lengths of the indicated lower corrective, addendum bows 229, 231 are incorporated into valves 229, 231, respectively and are such that they, in combination with addendum bows 228, 230, lower the pitch of acoustical path 226, 236, 237, 227 by one tone and one-half tone, respectively, when valves 221, 222 are individually actuated with valve 223 in the actuated position. By incorporating the corrective addendum bows only, within the valves, a lighter weight, less complex and less expensive instrument is effected.

The fully compensated four valve brass instrument embodiments of the present invention (as illustrated in FIGS. 1a and 2a), and the fully compensated five valve brass instrument embodiments of the present invention (as illustrated in FIGS. 1b and 2b), automatically play in tune over a continuous chromatic range of two and one-half or more octaves, without the necessity of the player having to compensate for out-of-tune tones by means of less than ideal lipping and/or manipulation of tuning slides. This results in several unexpected advantages including; endurance is easier to achieve; easier and faster learning by beginners; playing the instrument for longer periods of time with one breath; easier playing of trills and fast passages; in lower pitched brass instruments, extension downwardly from the fundamental tone of the continuous in-tune range by one-half octave or more; and the tone of the instrument is very sonorous.

What is claimed is:

1. In a brass instrument including mouthpiece and bell sections, a compensating valve system comprising:
   acoustical path means for acoustically connecting said mouthpiece and bell sections by two different acoustical paths differing in length so as to cause the instrument to sound two musical tones lower over one path than over the other path; a master valve having two positions, each of which causes a different one of said acoustical paths to be connected between said mouthpiece section and said bell section; and
   three valves each having two positions such that in one position, the acoustical path connections from the master valve and passing through the three valves maintain their length and in the other position, said acoustical paths are lengthened by respective addendum acoustical paths to effect a lowering of the pitch of the instrument using each acoustical path by one tone in one valve, one-half tone in the next valve and one and one-half tones in the third valve over and above whatever lowering is caused by the action of the master valve.

2. In a brass instrument including mouthpiece and bell sections, a compensating valve system comprising:
   acoustical path means for acoustically connecting said mouthpiece and bell sections by two different acoustical paths differing in length so as to cause the instrument to sound two and one half musical tones lower over one path than over the other path; a master valve having two positions, each of which causes a different one of said acoustical paths to be connected between said mouthpiece section and bell sections, and
   four valves each having two positions such that in one position, the acoustical path connections from the master valve and passing through the four valves maintain their length and in the other position, said acoustical paths are lengthened by respective addendum acoustical paths to effect a lowering of the pitch of the instrument using each acoustical path by one tone in one valve, one-half tone in the next valve, one and one-half tones in the third valve and two tones in the fourth valve over and above whatever lowering is caused by the action of the master valve.

3. A compensating valve system indended to fit between mouthpiece and bell sections in a brass instrument and comprising:
   four valves each having two positions such that in one position, the acoustical path through the valves from mouthpiece to bell sections maintains its lengths and in the other position, the acoustical path is lengthened by appropriate addendum acoustical paths to effect a lowering of the pitch of the instrument by one tone in one valve, one-half tone in the next valve, one and one-half tones in the third valve, and two tones in the fourth or master valve; the addendum acoustical path of the fourth valve passing through the other three valves in such a way that corrective acoustical path loops are added to the fourth valve addendum loop when the three valves are in a position to include their respective addendum loops in the instrument acoustical path; the corrective loops in conjunction with the addendum loops serve to depress the pitch of the instrument over and above that caused by the master valve addendum loop alone by the tonal amounts corresponding to those of the addendum loops of the respective valves when the fourth valve addendum loop is not included in the total acoustical path.

4. The system of claim 3 wherein said addendum loops of said first three valves are external to said valves and wherein each corrective loop is incorporated within the interior structure of the valve, the corrective acoustical path length being the difference in length between two acoustical paths within the valve; the corrective loop is added into the acoustical path corresponding to the master valve addendum loop at the appropriate valve position.

5. A compensating valve system intended to fit between mouthpiece and bell sections in a valved brass instrument and comprising:
   five valves each having two positions such that in one position the acoustical path through the valves from mouthpiece to bell sections maintains its length and in the other position, the acoustical path is lengthened by appropriate addendum acoustical paths to effect a lowering of the pitch of the instrument by one tone in one valve, one-half tone in the next valve, one and one-half tones in the third valve, two tones in the fourth valve and two and one-half tones in the fifth or master valve; the addendum acoustical path of the fifth valve passing through the other four valves in such a way that corrective acoustical path loops are added to the fifth valve addendum loop when the four valves are in a position to include their respective addendum loops in the instrument acoustical path; the corrective loops in conjunction with the addendum loops serve to depress the pitch of the instrument over and above that caused by the master valve addendum loop alone by the tonal amounts corresponding to those of the addendum loops of the respective valves when the fifth valve addendum loop is not included in the total acoustical path.

6. The system of claim 4 wherein said addendum loops of said first four valves are external to said valves and wherein each corrective loop is incorporated within the interior structure of the valve, the corrective acoustical path length being the difference in length between two acoustical paths within the valve; the corrective loop is added into the acoustical path corresponding to the master valve addendum loop at the appropriate valve position.

7. In a brass instrument including mouthpiece and bell sections, a compensating valve system comprising:
   first acoustical path means for acoustically connecting said mouthpiece and said bell sections to cause resonance at a fundamental pitch;
   second acoustical path means for acoustically connecting said mouthpiece and said bell sections to cause resonance at a pitch two tones lower than said fundamental pitch;
   selection means for selectively connecting the mouthpiece section to the bell section through a selected one of said first or second acoustical path means; and
   means for modifying said first and said second acoustical path means to selectively lower the resonant pitch of each said acoustical path means, when acoustically connected to the mouthpiece and the bell sections, by one tone, one-half tone, and one and one-half tones.

8. In a brass instrument including mouthpiece and bell sections, a compensating valve system comprising:
   first acoustical path means for acoustically connecting said mouthpiece and said bell sections to cause resonance at a fundamental pitch;
   second acoustical paths means for acoustically connecting said mouthpiece and said bell sections to cause resonance at a pitch two tones lower than said fundamental pitch;
   selection means for selectively connecting said mouthpiece section to said bell section through a selected one of said first or second acoustical path means; and
   a set of three individually actuable valves each of which, upon actuation, adds an acoustical path length to each of said first and said second acoustical path means, said added acoustical path lengths being selected to lower the resonant pitch of each of said first and said second acoustical path means, when acoustically connected to said mouthpiece and said bell sections, by one tone, one-half tone, and one and one-half tones, respectivley.

9. A compensating valve system as claimed in claim 8 wherein said selection means comprises a master valve actuable between two positions, the first of said positions providing acoustical connection of said mouthpiece section to said bell section through said first acoustical path means, and the second of said positions providing acoustical connection of said mouthpiece section to said bell section through said second acoustical path means.

10. A compensating valve system as claimed in claim 9 wherein each of said three individually actuable valves is a piston type valve.

11. A compensating valve system as claimed in claim 9 wherein each of said three individually actuable valves is a rotary type valve.

12. In a brass instrument including mouthpiece and bell sections, a compensating valve system comprising:
   first acoustical path means for acoustically connecting said mouthpiece and said bell sections to cause resonance at a fundamental pitch;
   second acoustical path means for acoustically connecting said mouthpiece and said bell sections to cause resonance at a pitch two and one-half tones lower than said fundamental pitch;
   selection means for selectively connecting said mouthpiece section to said bell section through a selected one of said first or said second acoustical path means; and
   means for modifying said first and said second acoustical path means to selectively lower the resonant pitch of each acoustical path when acoustically connected to the mouthpiece and the bell sections by one tone, one-half tone, one and one-half tones, and two tones.

13. In a brass instrument including mouthpiece and bell sections, a compensating valve system comprising:
   first acoustical path means for acoustically connecting said mouthpiece and said bell sections to cause resonance at a fundamental pitch;
   second acoustical path means for acoustically connecting said mouthpiece and said bell sections to cause resonance at a pitch two and one-half tones lower than said fundamental pitch;
   selection means for selectively connecting the mouthpiece section to the bell section through a selected one of said first or second acoustical path means; and
   a set of four individually actuable valves each of which upon actuation, adds an acoustical path length to each of said first and second acoustical path means, said added acoustical path lengths being selected to lower the resonant pitch of each of said first and second acoustical path means when acoustically connected to the mouthpiece and the bell sections by one tone, one-half tone, one, and one-half tones, and two tones, respectively.

14. A compensating valve system as claimed in claim 13 wherein said selection means comprises a master valve actuable between two positions, the first of said positions providing acoustical connection of the mouthpiece section to the bell section through said first acoustical path means, and the second of said positions providing acoustical connection of the mouthpiece section to the bell section through said second acoustical path means.

15. A compensating valve system as claimed in claim 13 wherein each of said four individually actuable valves is a piston type valve.

16. A compensating valve system as claimed in claim 13 wherein each of said four individually actuable valves is a rotary type valve.

17. In a brass instrument including mouthpiece and bell sections, a compensating valve system comprising:
   first acoustical path means for acoustically connecting said mouthpiece and said bell sections to cause resonance at a fundamental pitch;
   means for selectively adding second acoustical path means to said first acoustical path means, said second acoustical path means, being selected so that the resonant pitch of the combined first and second acoustical path means when acoustically connected to said mouthpiece and said bell sections is two tones lower than said fundamental pitch; and
   means for adding respective acoustical path lengths to said first and second acoustical path means, said additional acoustical path lengths being selected (1) to selectively lower the resonant pitch of said first acoustical path means when acoustically connected to said mouthpiece and said bell sections by one tone, one-half tone, and one and one-half tones, and (2) to selectively lower the resonant pitch of said combined first and second acoustical path means when acoustically connected to said mouthpiece and said bell sections by one tone, one-half tone, and one and one-half tones.

18. In a brass instrument including mouthpiece and bell sections, a compensating valve system comprising:
   first acoustical path means for acoustically connecting said mouthpiece and said bell sections to cause resonance at a fundamental pitch;
   means for selectively adding second acoustical path means to said first acoustical path means, said second acoustical path means being selected so that the resonant pitch of said combined first and second acoustical path means when acoustically connected to said mouthpiece and said bell sections is two tones lower than said fundamental pitch; and
   a set of three individually actuable valves each of which, upon actuation, adds a respective acoustical path to both said first and second acoustical path means, said additional acoustical paths being selected to lower the resonant pitch of each of said first and second acoustical path means when acoustically connected to said mouthpiece and said bell sections by one tone, one-half tone, and one and one-half tones.

19. A compensating valve system as claimed in claim 18 wherein the additional acoustical path added to said second acoustical path means by each of said three individually actuable valves is incorporated into the interior structure of the valve.

20. A compensating valve system as claimed in claim 18 wherein each of said three individually actuable valves is a piston type valve.

21. A compensating valve system as claimed in claim 18 wherein each of said three individually actuable valves is a rotary type valve.

22. In a brass instrument including mouthpiece and bell sections, a compensating valve system comprising:
first acoustical path means for acoustically connecting said mouthpiece and said bell sections to cause resonance at a fundamental pitch;
means for selectively adding a second acoustical path means to said first acoustical path means said second acoustical path means being selected so that the resonant pitch of said combined first and second acoustical path means, when acoustically connected to said mouthpiece and said bell sections, is two and one-half tones lower than said fundamental pitch; and
means for adding respective acoustical path lengths to said first and second acoustical paths means, said additional acoustical path lengths being selected (1) to selectively lower the resonant pitch of said first acoustical path means when acoustically connected to said mouthpiece and said bell sections by one tone, one-half tone, one and one-half tones, and two tones and (2) to selectivley lower the resonant pitch of said combined first and second acoustical path means, when acoustically connected to said mouthpiece and said bell sections by one tone, one-half tone, one and one-half tones, and two tones.

23. In a brass instrument including mouthpiece and the bell sections, a compensating valve system comprising:
first acoustical path means for acoustically connecting said mouthpiece and said bell sections to cause resonance at a fundamental pitch;
means for selectively adding a second acoustical path means to said first acoustical path means, said second acoustical path means being selected so that the resonant pitch of said combined first and second acoustical path means, when acoustically connected to said mouthpiece and said bell sections, is two and one-half tones lower than said fundamental pitch; and
a set of four individually actuable valves each of which upon actuation, adds a respective acoustical path to both said first and second acoustical paths, said additional acoustical paths being selected to lower the resonant pitch of each of said first and second acoustical paths when acoustically connected to the mouthpiece and the bell sections by one tone, one-half tone, one and one-half tones, and two tones.

24. A compensating valve system as claimed in claim 23 wherein the additional acoustical path added to said second acoustical path means by each of said four individually actuable valves is incorporated into the interior structure of the valve.

25. A compensating valve system as claimed in claim 23 wherein each of said four individually actuable valves is a piston type valve.

26. A compensating valve system as claimed in claim 23 wherein each of said four individually actuable valves is a rotary type valve.

27. In a brass instrument including mouthpiece and bell sections, a compensating valve system comprising:
first acoustical path means for acoustically connecting said mouthpiece and said bell sections to cause resonance at a fundamental pitch;
means for selectively adding a second acoustical path means to said first acoustical path means, said second acoustical path means, being selected so that the resonant pitch of said combined first and second acoustical paths, when acoustically connected to said mouthpiece and said bell sections, is one and one-half tones lower than said fundamental pitch; and
a set of two individually actuable valves each of which, upon actuation, adds external addenda acoustical paths to the first acoustical path means to lower the resonant pitch of said first acoustical path means by one tone and one-half tones and additionally add corrective acoustical paths to the second acoustical path means such that, when the second acoustical path means is combined with the first, the resonant pitch of said combined first and second paths is lowered by one tone and one-half tones, said corrective acoustical paths corresponding to said two individually actuable valves being incorporated into the interior structure of said valves.

28. In a brass instrument including mouthpiece and bell sections, the invention comprising:
first acoustical path means for acoustically connecting said mouthpiece and bell sections to cause resonance at a fundamental pitch;
means for selectively adding a second acoustical path means to said first acoustical path means, said second acoustical path means being selected so that the resonant pitch of said combined first and second acoustical paths, when acoustically connected to said mouthpiece and bell, is lowered by a first predetermined tonal value from said fundamental pitch; and
at least one individually actuable valve which, upon actuation, adds an external addendum path to the first acoustical path means to lower the resonant pitch of said first acoustical path means by a second predetermined tonal value, and additionally adds a corrective acoustical path to the second acoustical path means, such that, when the second acoustical path means is combined with said first acoustical path means, the resonant pitch of said combined paths is lowered by said second predetermined tonal value, said corrective acoustical path being incorporated into the interior structure of said valve.

* * * * *